(12) United States Patent
Nock

(10) Patent No.: US 6,335,741 B1
(45) Date of Patent: Jan. 1, 2002

(54) APPARATUS AND METHOD FOR USER INDICATION OF MODEL STATE IN A MODEL VIEW CONTROLLER

(75) Inventor: Clifton M. Nock, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/226,071

(22) Filed: Jan. 6, 1999

(51) Int. Cl.⁷ .................................................. G06F 3/00
(52) U.S. Cl. ........................ 345/764; 845/772; 845/966; 709/315
(58) Field of Search ................................ 345/326, 339, 345/329, 831, 966, 733, 764, 700, 772; 707/103; 706/60, 45, 46; 709/103, 315

(56) References Cited

U.S. PATENT DOCUMENTS

| | | | | |
|---|---|---|---|---|
| 5,479,601 A | * | 12/1995 | Matheny et al. | 345/326 |
| 5,926,177 A | * | 7/1999 | Hatanaka et al. | 345/340 |
| 6,023,271 A | * | 2/2000 | Quaeler-Bock | 345/335 |
| 6,100,885 A | * | 8/2000 | Donnelly et al. | 345/333 |

* cited by examiner

Primary Examiner—John Cabeca
Assistant Examiner—Kieu D. Vu
(74) Attorney, Agent, or Firm—Martin & Associates, LLC; Derek P. Martin

(57) ABSTRACT

A model view controller has a model and a view with one or more listeners, and each listener may register with the model when the listener desires to be notified of a change of state in the model. In the preferred embodiment, when the model is about to change its state, it notifies all registered listeners, and after the model has changed its state, it notifies all registered listeners again. The present invention thus allows the model to notify the view when the state of the model changes, and the view can then decide what actions to perform, such as suitable indications to the user of the model state. The present invention thus achieves efficient user notification of the state of the model within the constraints of the model view controller paradigm.

24 Claims, 7 Drawing Sheets

```
public class WorkingEvent
extends java.util.EventObject
{
        // Constructor.
        public WorkingEvent (Object source)
        {
                super(source);
        }
}
```

FIG. 6

```
public interface WorkingListener
extends java.util.EventListener
{
        // Invoked when the Model begins working.
        public abstract void startWorking (WorkingEvent event);

// Invoked when the Model is done working.
        public abstract void stopWorking (WorkingEvent event);
}
```

FIG. 7

```
public class ExampleWorkingListener
implements WorkingListener
{
        private Component component_;

// Constructor.
        public ExampleWorkingListener (Component component)
        {
                component_ = component;
        }
        // Invoked when the Model begins working.  Sets the cursor to
        // the hourglass and disables input to the component.
        public void startWorking (WorkingEvent event)
        {
                component_.setEnabled(false);
                component_setCursor(java.awt.Cursor.getPredefinedCursor
                        (java.awt.Cursor.WAIT_CURSOR));
        }
        // Invoked when the Model is done working.  Sets the cursor to
        // the default and enables input to the component.
        public void stopWorking (WorkingEvent event)
        {
                component_setCursor(java.awt.Cursor.getPredefinedCursor
                        (java.awt.Cursor.DEFAULT_CURSOR));
                component_.setEnabled(true);
        }
```

FIG. 8

```
public class ExampleModel
{
        // Keep a list of registered listeners.
        private java.util.Vector listeners_;

// Registers a listeners so that it gets notified when the
        // working state of the Model changes.
        public void addWorkingListener (WorkingListener listener)
        {
                listeners_.addElement(listener);
        }

// Un-registers a listener so that it no longer gets notified when
        // the working state of the Model changes.
        public void removeWorkingListener(WorkingListener listener)
        {
                listeners_.removeElement(listener);
        }

// This is some sample code that does some work
        // (e.g., network communication).
        public void sampleCode()
        {
        // Fire a start working event. This notifies all listeners that
        // the working state has changed - that work is about to begin.
        WorkingEvent event = new WorkingEvent(this);
        for (int i=0; i<listeners_.size(); ++i)
                listeners_.startWorking(event);

//
        // . . . Do the work . . .
        //

// Fire a stop working event. This notifies all listeners that
        // the working state has changed again - that work is done.
        for (int i=0; i<listeners_.size(); ++i)
                listeners_.stopWorking(event);
        }
}
```

FIG. 9

```
public class ExampleView
extends java.awt.Frame
{
        private ExampleModel model_;

// Constructor.
        public ExampleView (ExampleModel model)
        {
                model_ = model;
                //
                // . . . Initialize the graphical user interface . . .
                //

//  Initialize the working listener.
                ExampleWorkingListener workingListener =
                        new ExampleWorkingListener(this);

// Register the working listener with the Model.
                model_.addWorkingListener(workingListener);
        }
}
```

APPARATUS AND METHOD FOR USER INDICATION OF MODEL STATE IN A MODEL VIEW CONTROLLER

BACKGROUND OF THE INVENTION

1. Technical Field

This invention generally relates to computer systems and more specifically relates to graphical user interfaces for computer systems.

2. Background Art

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Early computer systems used command-based operating systems and software applications. These command-based systems provided a user interface that required the user to memorize a relatively large number of commands in order to perform meaningful work. The user interfaces for these command-driven computer programs required a relatively high level of skill to operate, and were not considered to be "user-friendly." With the introduction of the IBM personal computer (PC), computers became more widely available, both in the workplace and in homes, and the computer industry soon recognized the need to provide more user-friendly interfaces to computer programs. As a result, many different operating systems were introduced that provided a graphical user interface (GUI), including IBM's OS/2, Microsoft Windows, and the Apple McIntosh. Software applications with graphical user interfaces soon followed, and the vast majority of computer programs running on personal computers today provide a user-friendly graphical user interface.

One trend in graphical user interfaces is to separate the functions of the portion that does the underlying work and manipulates data, known as the model, from the graphical presentation to the user, known as the view. This trend has led to the development of a paradigm known as a model view controller, which attempts to keep the model separate from the view and controller functions so that changes to the model do not affect the view, and vice versa. The model view controller also makes it possible for may different views to be associated with a single model.

There are circumstances when the view may desire to know the state of the model. For example, if the model is busy performing some work, such as communicating over a network or performing file input/output (I/O), it would be nice to display an indication on the view presented to the user that the model was busy. One way to accomplish the indication of a busy model is to have the model itself present some indication to the user. However, this is clearly a violation of the model view controller paradigm because the model would now be responsible for some user interface code, and would have to provide the same indication to all views associated with the model. In the alternative, the view could poll the model at regular intervals to see if the model is working, and provide an indication to the user when the model is busy. However, if the polling interval is too short, overall performance of the application can be adversely affected. If the polling interval is too long, the indication can be ineffective or inaccurate. Without an efficient mechanism that provides an indication to the user of the state of the model without violating the model view controller paradigm, the computer industry will continue to suffer from applications that either provide no indication of the state of the model to the user when the model is busy, that violate the model view controller paradigm, or that provide the indication at a significant performance cost.

DISCLOSURE OF INVENTION

According to the preferred embodiments, a model view controller has a model and a view with one or more listeners, and each listener may register with the model when the listener desires to be notified of a change of state in the model. When the model is about to change its state, it notifies all registered listeners, and after the model has changed its state, it notifies all registered listeners again. The present invention thus allows the model to notify the view when the state of the model changes, and the view can then decide what actions to perform. One suitable example allows the model to notify all registered listeners before performing network communications, which would allow the view to disable the component on the graphical user interface and present a suitable wait cursor, such as an hourglass or a clock face. Once the network communications are complete, the model notifies all registered listeners that the model is no longer busy, which causes the view to change the cursor back to the default cursor and to enable the graphical user interface component again. The present invention thus achieves efficient user notification of the state of the model within the constraints of the model view controller paradigm.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 6 shows java pseudo-code for a WorkingEvent class used in a java-specific implementation in accordance with the preferred embodiments;

FIG. 7 shows java pseudo-code for the WorkingListener interface of FIG. 3;

FIG. 8 shows java pseudo-code for the ExampleWorkingListener class of FIG. 3;

FIG. 9 shows java pseudo-code for the ExampleModel class of FIG. 3; and

FIG. 10 shows java pseudo-code for the ExampleView class of FIG. 3.

BEST MODE FOR CARRYING OUT THE INVENTION

According to a preferred embodiment of the present invention, one or more listeners in the view of a model view controller register with the model to be notified of changes in the state of the model. Before the model changes state, it notifies all registered listeners that it is about to change state. This allows the view to provide an indication to the user when the model is busy.

Figure 1:
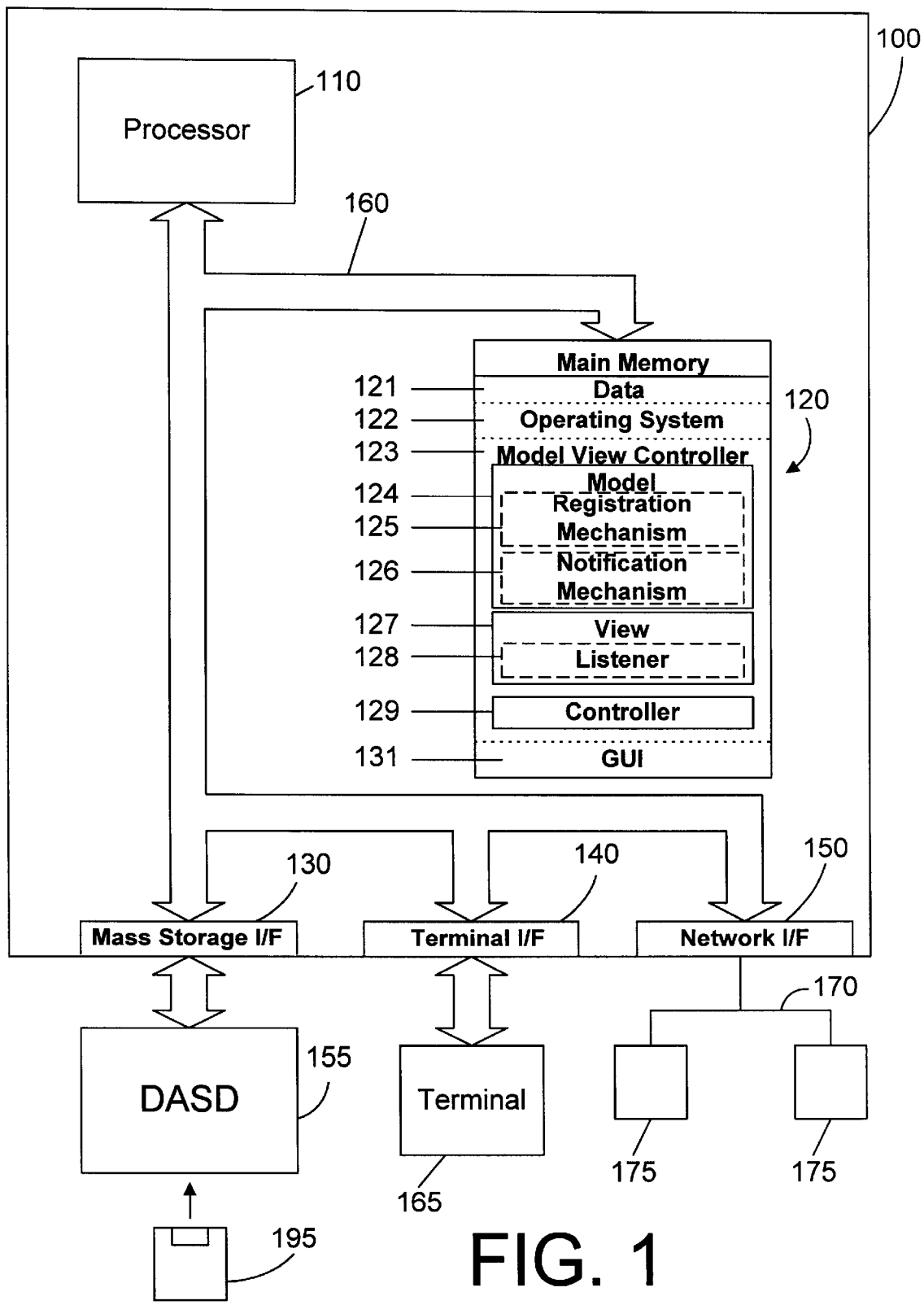
FIG. 1 is a block diagram of an apparatus in accordance with a preferred embodiment of the present invention.

Referring to FIG. 1, a computer system 100 in accordance with the preferred embodiment is an enhanced IBM RS/6000 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 in accordance with the preferred embodiments contains data 121, an operating system 122, a model view controller 123, and a graphical user interface (GUI) 131. Model view controller 123 suitably includes a model 124, a view 127, and a controller 129. Model 124 includes a registration mechanism 125 and a notification mechanism 126. View 127 includes one or more listeners 128 that use the registration mechanism 125 to register with model 124 so that model 124 will notify the registered listeners when the state of model 124 changes. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, model view controller 123, and GUI 131 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 121 represents any data that serves as input to or output from any program in computer system 100. Operating system 122 is a multitasking operating system known in the industry as AIX; however, those skilled in the art will appreciate that the spirit and scope of the present invention is not limited to any one operating system.

Model 124 includes a registration mechanism 125 and a notification mechanism 126. In the preferred embodiments, these mechanisms are object oriented mechanisms. The registration mechanism 125 is used by a listener 128 invoking appropriate object methods on the model 124 to register or un-register with the model. Registration mechanism 125 comprises a means for registering at least one listener in the model view controller with the model. Notification mechanism 126 is an object oriented mechanism in the preferred embodiment that notifies all registered listeners of a change of state in the model. Notification mechanism 126 may notify registered listeners of any suitable change in state in the model 124. For example, notification mechanism 126 may notify registered listeners when the state is about to change, when the state has just changed, or when the state has returned to a previous state. Notification mechanism 126 comprises a means for notifying the registered listeners of a change of state in the model. The term "state" herein is not intended to mean a specific state or type of state within the model, but is used generically to refer to literally any state or change of state in the model that may be of interest. The model determines from certain performance parameters which changes to its state might be of interest to the registered listeners, and notifies the registered listeners whenever any of the predefined changes of state occur.

View 127 includes one or more listeners 128 that may register with the model 124 via registration mechanism 125 so that model 124 will notify the listener 128 of changes to the model's state. In the preferred embodiments, listener 128 is a concrete subclass that implements an object oriented interface. If listener 128 desires to be notified of changes of state in model 124, listener 128 registers with model 124 via registration mechanism 125. Once registered, listener 128 will be notified via notification mechanism 126 of suitable changes in state of model 124. If listener 128 is registered to model 124 and receives a notification from notification mechanism 126, the view 127 may perform any suitable action in response to the notification. For example, in response to a notification that the model is busy with network communications, the view 127 may change the cursor to a wait cursor, such as an hourglass or clock face, and disable one or more components of the graphical user interface 131. In response to a notification that the model has completed its network communications, the view 127 may change the cursor back to the default cursor, and enable any component(s) that was disabled previously. The view 127 may respond to a notification in any suitable way, including the generation and/or presentation to the user of text, graphics, audio, video, multimedia, or other indicia to indicate the change in state in the model. Note that view 127 need not provide an indication of each change of state, and that no action is a valid response to a notification.

Graphical user interface 131 is any suitable graphical interface that allows a user to graphically interact with computer system 100. Examples of suitable graphical user interfaces include the interfaces supported by OS/2, Windows, and Apple operating systems.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions shown in main memory 120 may reside on another system and engage in cooperative processing with one or more objects or programs that reside on computer system 100. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 2:
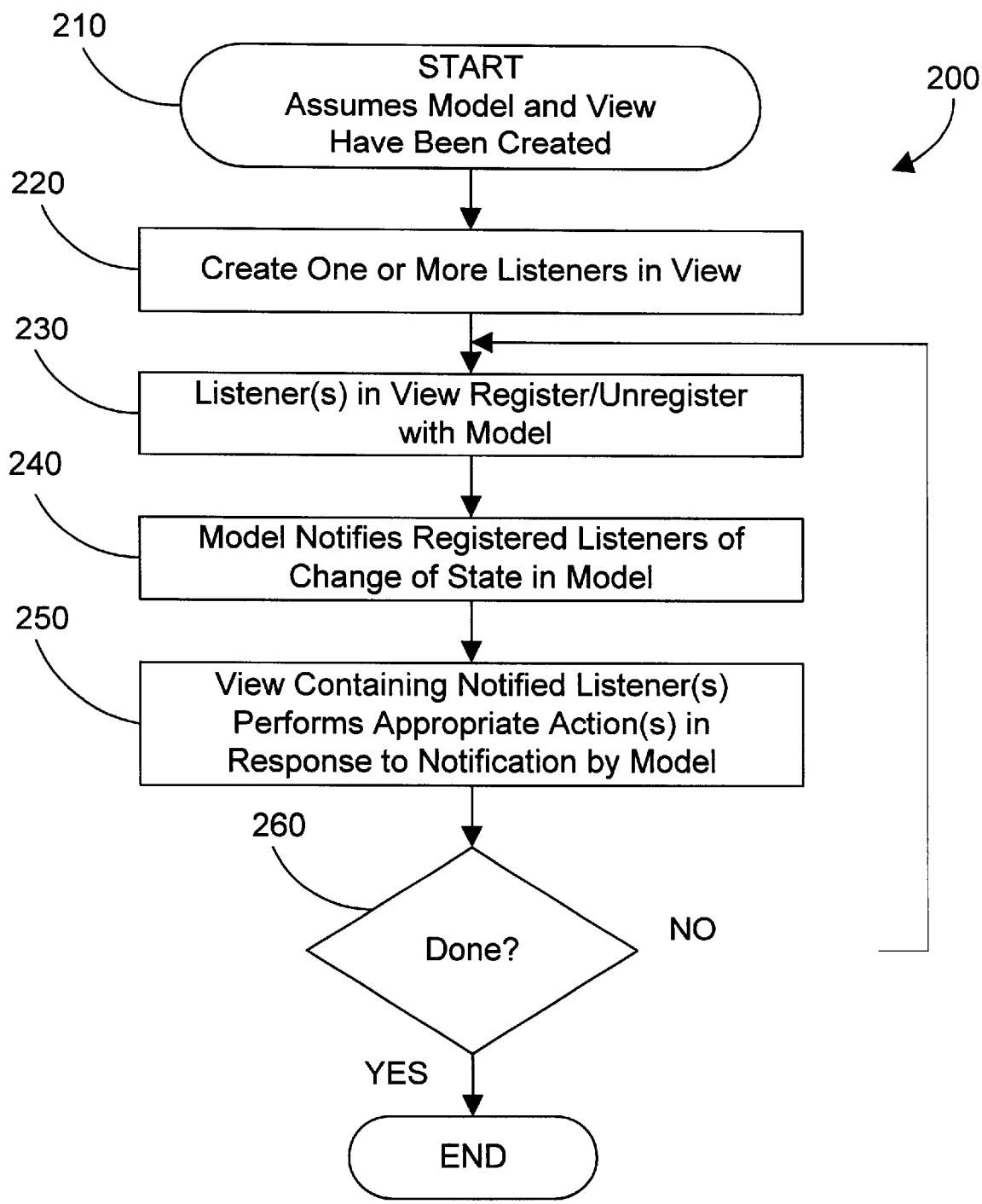
FIG. 2 is a flow diagram of a method for notifying a user of a change of state in the model of a model view controller in accordance with a preferred embodiment of the present invention.

Referring to FIG. 2, a method 200 in accordance with the present invention begins by assuming that a model and view in a model view controller have been previously created (step 210). One or more listeners are then created in the view (step 220). Each listener then has the option of registering with the model (step 230). If a listener has previously registered with the model, it also has the option of un-registering with the model. A listener registers with the model if it desires notification of a change of state in the model. Next, the model notifies all listeners that have registered with it of a change of state in the model (step 240).

In response, the view that contains the notified listener(s) performs one or more appropriate actions in response to the notification by the model (step 250). For example, if the change of state indicates that the model is about to start working, appropriate actions might include the display of a wait cursor and the disabling of the current component on the graphical user interface. If the change of state indicates that the model is through working, appropriate actions might include the display of the default cursor and the re-enabling of the component on the graphical user interface. If no more processing is needed, method 200 is done (step 260=YES). Otherwise, step 260 is NO, and the process continues.

Figure 3:
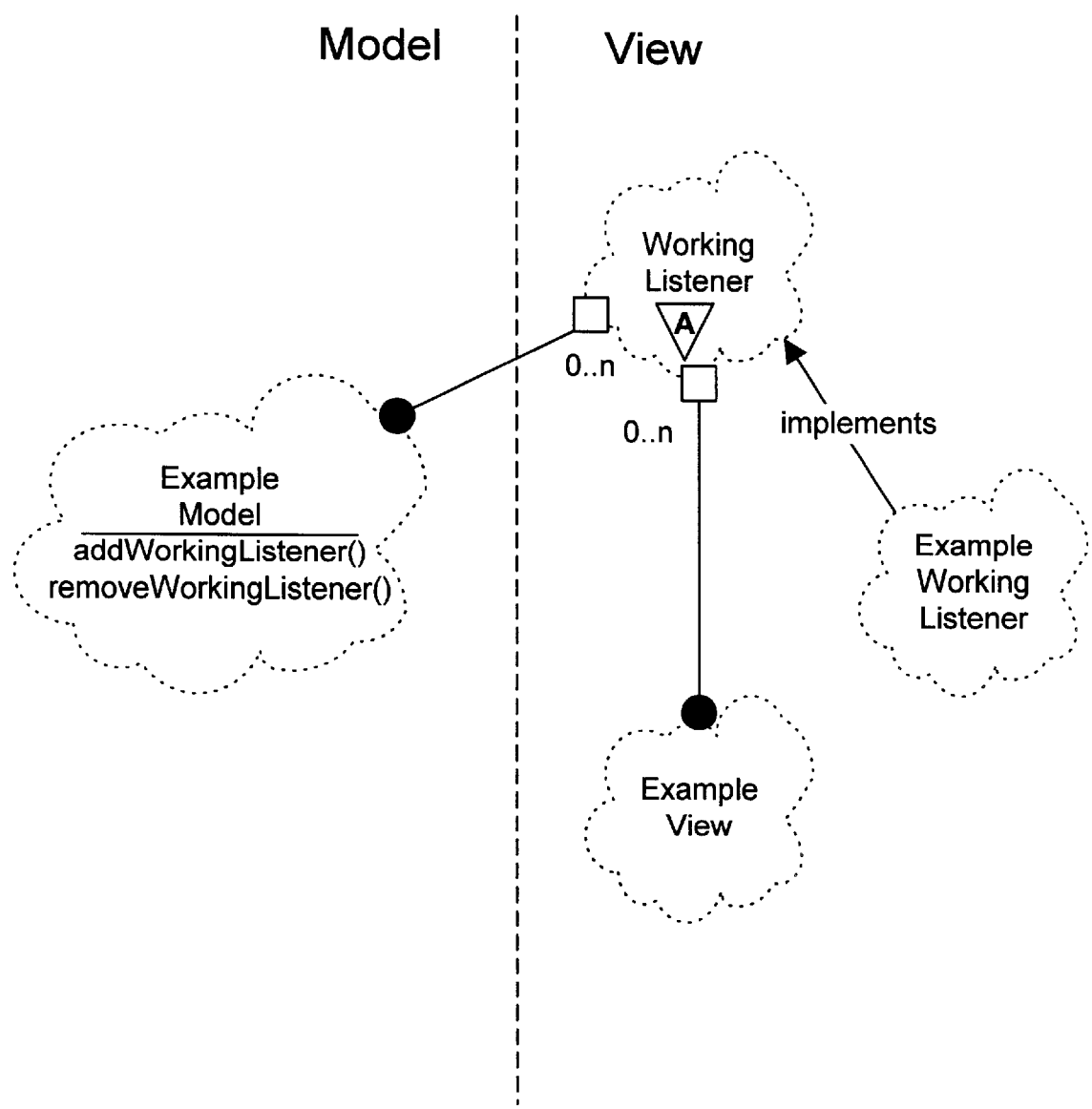
FIG. 3 is a class diagram of classes used in a preferred object oriented implementation of the present invention.

The best mode of the present invention is an object oriented implementation shown in FIGS. 3–10. Referring to FIG. 3, the model view controller includes a model ExampleModel that defines the methods addWorkingListener( ) and removeWorkingListener( ). The addWorkingListener( ) method is used to add a listener to the registry of the model, and thus corresponds to a registration mechanism (e.g., 125 of FIG. 1) for the ExampleModel. The removeWorkingListener( ) method is used to remove a listener from the registry of the model, which is also corresponds to the registration mechanism for the model. The ExampleModel may include any suitable code for processing data and interacting with the ExampleView.

The view of the model view controller includes a working listener abstract class or interface, represented in FIG. 3 as an abstract class. When a programmer wants to make an object a listener, he or she does so by implementing the WorkingListener interface. Thus, in FIG. 3, the ExampleWorkingListener is a concrete subclass of the WorkingListener interface by implementing this interface. An ExampleView is also provided that contains code for presenting the user interface to the user. The ExampleModel and ExampleView both have a "contains by reference" relationship with the working listener abstract class, indicating that the ExampleModel and ExampleView may reference multiple working listeners.

Figure 4:
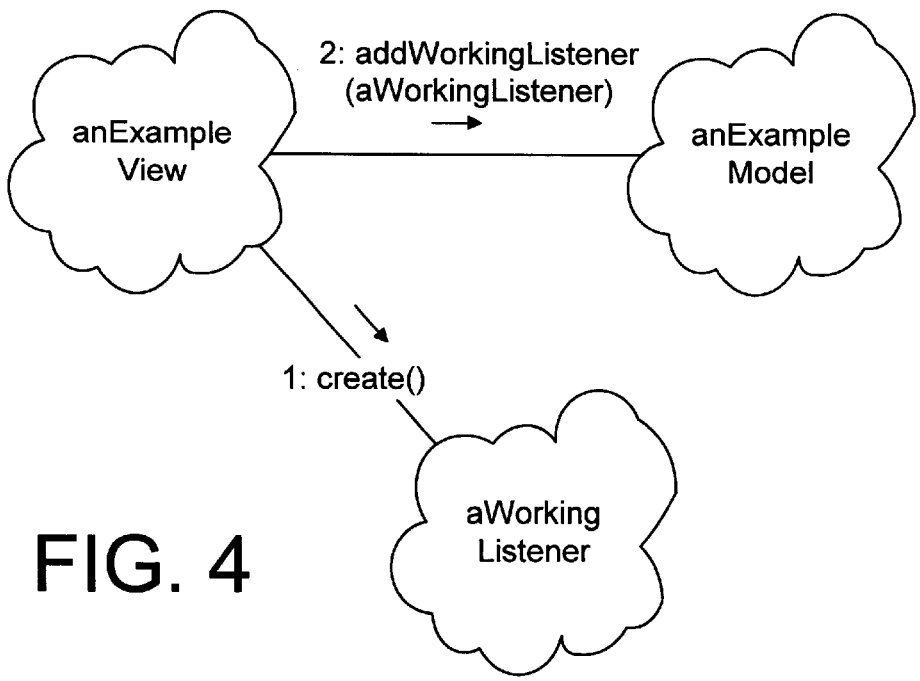
FIG. 4 is an object diagram showing the creation of a concrete listener in the view and the registration of the concrete listener with the model.

Referring to FIG. 4, an object diagram illustrates the process of creating a listener and registering the listener with a model. We assume that an object anExampleView has been created as an instance of the ExampleView class of FIG. 3. The anExampleView object creates an instance of the WorkingListener class (step 1). The anExampleView object then registers the newly-created listener with the anExampleModel object by invoking its addWorkingListener( ) method (step 2), passing the aWorkingListener object as a parameter. In response, the anExampleModel object adds the aWorkingListener object to its registry of registered objects that desire notification upon certain changes of state in the model. Although not explicitly shown in the figures, the process of unregistering a listener from the registry of the anExampleModel object is performed by invoking the removeWorkingListener( ) method on the anExampleModel object, passing the listener to be removed as a parameter.

Figure 5:
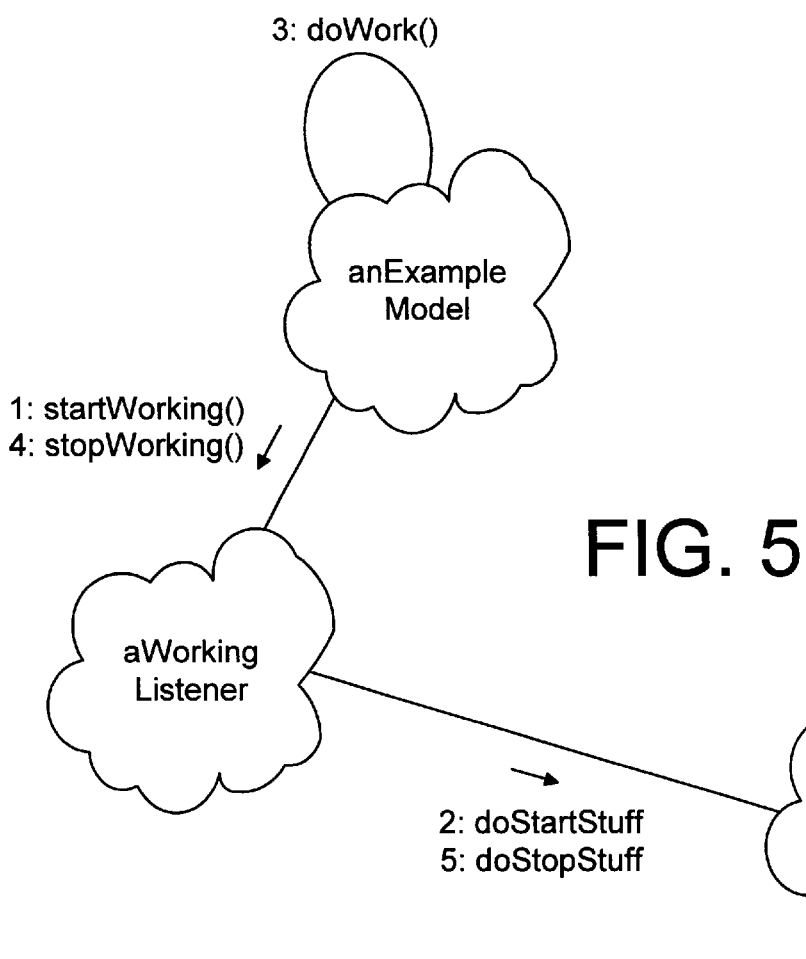
FIG. 5 is an object diagram showing the notification of a registered listener, which in turn performs predetermined actions in response to the notification.

Referring now to FIG. 5, an object diagram shows how notifications occur once a listener has registered with a model. We assume that the model represented by the anExampleModel object needs to notify its registered listeners due to a change of state in the model. One example of a suitable change of state occurs when the model needs to perform network communications or file I/O, which can take a relatively long time. When the model needs to communicate its change of state, it invokes a method on the working listener. For the specific example of FIG. 5, a method startWorking( ) is provided on the aWorkingListener object to signal that the model is about to become busy. The anExampleModel object invokes the startWorking( ) method on its registered listeners, which include the aWorkingListener object (step 1). In response, the aWorkingListener object performs any suitable action (including no action), represented in FIG. 5 as doStartStuff (step 2). One suitable example of an action the aWorkingListener object may take is to change the cursor to a wait cursor to visually indicate to the user that the model is busy, and to disable the GUI component (represented by aGUIObject in FIG. 5) so the user may not select it while the model is busy. In the meantime, the anExampleModel object is performing work (step 3). When the anExampleModel object is done with the work, it invokes the stopWorking( ) method on its registered listeners, which includes the aWorkingListener object (step 4). In response, the aWorkingListener object may perform any suitable actions (including no action), represented in FIG. 5 as doStopStuff. One example of suitable actions when the model is no longer busy is to replace the wait cursor with the default cursor, and to re-enable the GUI component so the user may select it.

One specific detailed implementation of the present invention is shown using the java pseudo-code of FIGS. 6–10. FIG. 6 shows the code for the WorkingEvent class, which is a class that is used to signal an event in java, which can correspond to a change of state in the model. FIG. 7 shows the code for the WorkingListener interface, which provides the methods startWorking( ) and stopWorking( ) shown in FIG. 5 to signal when the model is about to become busy and to signal when the model is no longer busy, respectively. FIG. 8 shows the code for the ExampleWorkingListener class, which implements the WorkingListener interface of FIG. 7, which provides code that disables the GUI component and displays a wait cursor when the startWorking( ) method is invoked, and which provides code that changes the wait cursor back to the default cursor and re-enables the GUI component when the stopWorking( ) method is invoked.

FIG. 9 shows the code for the ExampleModel class, which defines methods addWorkingListener( ) and removeWorkingListener( ) as shown in FIG. 3, and which shows that the startWorking( ) method for all registered listeners is invoked before doing some work that defines a change of state in the model, and that the stopWorking( ) method for all registered listeners is invoked after doing the work. FIG. 10 shows the code for the ExampleView class, which invokes the addWorkingListener( ) class on a model object to register a working listener object with the model.

The preferred embodiments thus provide a way for a model to provide efficient notifications to the view when its state changes without violating the model view controller paradigm. The model has a registry of listeners, and a listener registers with the model if it desires notification of state changes in the model. When the model changes state, it notifies the registered listeners of this change. In the preferred embodiments, the model notifies the registered listeners immediately before a state change, and immediately after a state change, allowing the view to provide a user indication of these state changes in the model.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

I claim:
1. An apparatus comprising:
   at least one processor;
   a memory coupled to the at least one processor;
   a model view controller residing in the memory, the model view controller including:
      a model that includes at least one function that manipulates data;
      a view that includes at least one listener, the at least one listener registering with the model, the view comprising a graphical presentation of data in the model; and
      the model notifying all registered listeners of an impending change of state in the model before the change of state in the model occurs; and
      the model notifying all registered listeners after the change of state in the model occurs.
2. The apparatus of claim 1 wherein the model includes a registration mechanism that allows the at least one listener to register with the model and a notification mechanism for notifying all registered listeners of the change of state in the model.
3. The apparatus of claim 1 wherein the at least one listener comprises at least one instance of an object oriented listener class.
4. The apparatus of claim 1 wherein the model includes a registration mechanism that allows the at least one listener to register with the model.
5. The apparatus of claim 1 wherein the model includes a notification mechanism for notifying the registered listeners of a change of state in the model.
6. The apparatus of claim 1 wherein the view notifies the user of the apparatus in response to the registered listener receiving the notification from the model.
7. An apparatus comprising:
   a memory;
   a model view controller residing in the memory;
   means residing in the memory for registering at least one listener in the model view controller with a model in the model view controller, wherein the model comprises at least one function that manipulates data;
   means residing in the memory for the model to notify all registered listeners of an impending change of state in the model before the change of state in the model occurs, and
   means residing in the memory for the model to notify all registered listeners after the change of state in the model occurs.
8. A computer-implemented method for providing a user indication of the state of a model in a model view controller, the method comprising the steps of:
   providing at least one listener in a view of the model view controller, the view comprising a graphical presentation of data in the model;
   registering the at least one listener with the model in the model view controller;
   the model notifying the at least one listener of an impending change of state in the model before the change of state in the model occurs; and
   the model notifying the at least one listener after the change of state in the model occurs.
9. The method of claim 8 further comprising the step of:
   the view in the model view controller providing the user indication in response to the model notifying the at least one listener.

10. The method of claim 8 wherein the user indication comprises a visual indication.

11. The method of claim 8 wherein the step of providing the at least one listener comprises the step of defining a concrete object oriented subclass that implements a listener interface.

12. A computer-implemented method for providing a user indication of the state of a model in a model view controller, the method comprising the steps of:

provifing at least one listener in a view of the model view controller, the view comprising a graphical presentation of data in the model;

registering the at least one listener with the model in the model view controller, and the model notifying the at least one listener when a change of state occurs in the model;

wherein the model view controller comprises an object oriented model view controller, and wherein:

the step of providing the at least one listener comprises the step of defining a concrete subclass that implements a listener interface;

the step of registering the at least one listener with the model in the model view controller comprises the step of invoking at least one method on a model object corresponding to the model; and the step of the model notifying the at least one listener when a change of state occurs in the model comprising the step of the model invoking at least one method on the at least one listener.

13. A program product comprising:

(A) a model view controller including:

(A1) a model that includes at least one function that manipulates data;

(A2) a view that includes at least one listener, the at least one listener registering with the model, the view comprising a graphical presentation of data in the model; and (A3) the model notifying all registered listeners of an impending change of state in the model before the change of state in the model occurs, and notifying all registered listeners after the change of state in the model occurs; and (B) signal bearing media bearing the model view controller.

14. The program product of claim 13 wherein the signal bearing media comprises recordable media.

15. The program product of claim 13 wherein the signal bearing media comprises transmission media.

16. The program product of claim 13 wherein the model includes a registration mechanism that allows the at least one listener to register with the model and a notification mechanism for notifying all registered listeners of the change of state in the model.

17. The program product of claim 13 wherein the at least one listener comprises at least one instance of an object oriented listener class.

18. The program product of claim 13 wherein the model includes a registration mechanism that allows the at least one listener to register with the model.

19. The program product of claim 13 wherein the model includes a notification mechanism for notifying the registered listeners of a change of state in the model.

20. The program product of claim 13 wherein the view notifies the user of the apparatus in response to the registered listener receiving the notification from the model.

21. The apparatus of claim 1 wherein the model comprises at least one object oriented model class that defines:

at least one object method that is invoked to register the at least one listener with the model by placing the at least one listener in a registry of registered listeners; and at least one object method that is invoked to unregister the at least one listener with the model by removing the at least one listener from the registry of registered listeners.

22. The method of claim 8 wherein the step of registering the at least one listener with the model comprises the step of invoking at least one object method on an instance of a model class that defined the model to place the at least one listener in a registry of registered listeners.

23. The method of claim 22 further comprising the step of invoking at least one object method on the instance of the model class to unregister the at least one listener with the model by removing the at least one listener from the registry of registered listeners.

24. The program product of claim 13 wherein the model comprises at least one model class that defines:

at least one object method that is invoked to register the at least one listener with the model by placing the at least one listener in a registry of registered listeners; and at least one object method that is invoked to unregister the at least one listener with the model by removing the at least one listener from the registry of registered listeners.

* * * * *